Patented Sept. 27, 1938

2,131,142

UNITED STATES PATENT OFFICE 2,131,142

ADDITION PRODUCTS OF GLYCIDE

Ludwig Orthner, Frankfort-on-the-Main, and Claus Heuck, Ludwigshafen-on-the-Rhine, Germany, assignors to General Aniline Works, Inc., New York, N. Y., a corporation of Delaware No Drawing. Application April 15, 1936, Serial No. 74,594. In Germany March 2, 1932

3 Claims. (Cl. 260—482)

The present invention relates to new addition products of certain organic compounds containing reactive hydrogen atoms and glycide, the said products having been aftertreated with alkylene oxides other than glycide.

In our copending application Ser. No. 658,266, now matured into Patent No. 2,089,569 of which the present application is a continuation in part, we have described new products being obtainable by adding glycide to another organic compound containing a radical bearing reactive hydrogen selected from the group, consisting of hydroxy, amino, carboxylic, carboxylic acid amide and sulfonic acid amide radicals. The said products are valuable assisting agents in the textile and related industries.

As stated in our copending case we have found besides that the new glycide addition products can be furthermore converted by causing them to react with other alkylene oxides, like ethylene oxide, propylene oxide, butylene oxide etc. Thereby the glycide addition products are made still more valuable since they apparently become more uniform as regards their properties and their behaviour, for example their solubility in water.

As starting materials for this process there may be broadly envisaged the organic compounds containing reactive hydrogen atoms which are used in the process of our copending application. For instance, the following compounds may be mentioned as examples: butyl-, dodecyl- and oleylalcohol, castor oil, glycerine, glycerides containing free hydroxy groups as, for instance, mono and diglycerides of high molecular fatty acids, sorbit, starch, phenol, alkylated phenols and naphthols or their hydrogenated products, cresol, xylenol, naphthol, dihydroxy phenols, the esters of salicylic acid etc. Furthermore, one may use mono- and polyvalent aliphatic and aromatic amines, for instance, butyl amine, octadecyl amine, amines obtainable from train oil, abietylamine, benzylamine, hexahydroaniline, dibutylamine, cyclohexylethylaniline, dicyclohexylaniline, piperidine, morpholine, diethanolamine, diethylene diamine, aniline, its homologues and substitution products as, for instance, diphenylamine, p-isooctylaniline, dodecyl- and isododecylaniline, which compounds may also be hydrogenated in the aromatic nuclei, amino phenols, amino alcohols, naphthyl amine, arylene diamine, naphthylene diamine, ethyl aniline etc.

The reaction can also be performed with mono- and polyvalent carboxylic acids such as butyric acid, lauric acid, palmitic acid, oleic acid, linoleic acid, coconut oil fatty acid, ricinoleic acid, lactic acid, maleic acid, tartaric acid, adipic acid, oleylglycocoll, stearylsarcosine, benzoic acid, phenyl acetic acid, anthranilic acid etc.

As starting materials there can likewise be applied amides of carboxylic acids and organic sulfonic acids, if they contain reactive hydrogen atoms, for instance in the amino group and/or in the substituents thereof. As examples of such compounds there may be mentioned butyric acid ethylamide, the hydroxy ethyl amide of lactic acid, oleyl amides, the hydroxy ethyl amide of palmitic acid, the hydroxy ethyl amide of coconut fatty acid, the anilide of linoleic acid, the dihydroxy propylamide of ricinoleic acid, the butyl amide of benzoic acid, the naphthylamide of salicylic acid, phthalimide, phthalamic acid, the cyclohexylamide of the toluene sulfonic acid, substituted amides of amino benzene sulfonic acid, the amide obtainable from 1 mol of lauric acid and 1 mol of ethylene diamine which still contains a free amino group.

The addition of glycide and the further reaction of the addition products with alkylene oxides other than glycide, is carried out in the usual manner by causing the said constituents to react with each other, preferably in the presence of alkaline reacting substances and while heating. Instead of the free alkylene oxides halogenhydrines may also be used, which in the presence of alkali will intermediately yield the oxides. The reaction may be performed in the presence of water and/or of suitable organic solvents or diluents like, for instance, pyridine. A preferred modification of our process is by first adding a relatively small quantity of glycide, e. g. up to about 5 molecular quantities, to the organic compound and then causing another alkylene oxide to react therewith.

The products obtained in this way may be used alone, in mixtures with one another and/or with other assistants in various processes of the textile, leather, paper and related industries, for instance, as washing, wetting, equalizing or dispersing agents.

The following examples illustrate the invention without limiting it thereto, the parts being by weight:

*Example 1*

70 parts of glycide are dropped while constantly stirring, at a temperature of about 60–80° C. into 68 parts of a mixture of the amines obtainable from train oil fatty acid, with the addition of a little water. When the reaction is complete, ethylene oxide is passed through the mixture, until its weight has increased for about 70 parts. The resulting oily substance is easily soluble in water and can be used as washing, wetting, dispersing and equalizing agent, especially in dyeing with vat dyestuffs. By further treating it with alkylating agents, for instance, dimethylsulfate, alkyl halogenides, the washing capacity for wool is still increased.

Instead of the train oil amines there may be used the corresponding molecular quantity of abietyl amine or aromatic amines like diphenylamine, dodecylaniline and their hydrogenated derivatives.

Example 2

28 parts of oleic acid are heated in a pressure apparatus with 15 parts of glycide for several hours at a temperature of about 60–100° C., thereafter ethylene oxide is passed through the mixture until its weight has increased for about 17 parts. The resulting product is a good emulsifying agent for fats and mineral oils. If instead of oleic acid the corresponding quantity of stearic acid is employed a good softening agent for textiles will be obtained.

Example 3

To 220 parts of coconut fatty acid containing about 0.5% of potash soap, 150 parts of glycide are gradually added at 110–120° C. Afterwards ethylene oxide is passed into the mixture until its weight has increased for about 350 parts. The resulting products possess a good washing and foaming capacity.

Instead of coconut fatty acids also other fatty or carbonic acids containing fatty residues may be transformed in a corresponding way into washing, emulsifying or dispersing agents, as for instance, oleylsarcosine or stearyl-m-amidobenzoic acid. For the said purpose also aromatic or cycloaliphatic carbonic acids may be employed containing in the nucleus at least one cycloalkyl or alkyl residue with more than three carbon atoms as, for instance, triisobutylhydrocinnamic acid, dodecylphenyl acetic acid or their hydrogenated derivatives and the like.

Example 4

100 parts of oleyl alcohol to which 0.3% potassium hydroxide have been added, are gradually mixed at 130–150° C. with 50–100 parts of glycide. Thereafter 220–260 parts of ethylene oxide are passed into the mixture at about the same temperatures. The resulting product is easily soluble in water and may be used as washing, wetting, dispersing, equalizing and emulsifying agent.

Example 5

In the same way as described in Example 4, 30 parts of castor oil can be caused to react with 75 parts of glycide and then with 130 parts of ethylene oxide. The resulting product is a good emulsifying agent for oleic acid.

Example 6

Instead of the aliphatic hydroxy compounds of Examples 4 and 5 there may also be used suitable aromatic and araliphatic hydroxy compounds. For instance, if 26 parts of isododecylphenol are treated in the presence of potassium hydroxide at about 140° C. with 8–15 parts of glycide and afterwards with 45–55 parts of ethylene oxide, a watersoluble product displaying a remarkable washing capacity is obtained. As a further example, the conversion of 27 parts of dodecylcyclohexanol with 8 parts of glycide and then another 8 parts of ethylene oxide may be mentioned; by sulfonating this product a good washing, wetting and dispersing agent will result.

Example 7

15–20 parts of glycide are slowly dropped into 25 parts of coconut fatty acid hydroxyethylamide containing 0.5 part of 33% caustic soda lye, and the resulting product is treated with ethylene oxide at 90–100° C., until the weight has increased for about 35–45 parts. A good washing agent, especially for cotton, is obtained. If the quantity of the ethylene oxide having reacted with the glycide addition product is less (about 10–12 parts), the product is especially suitable for degreasing wool.

Example 8

The amide obtainable from 17.5 parts of m-aminobenzene sulfonic acid amide by condensing with oleic acid chloride in the presence of pyridine, is mixed with about 0.3% caustic potash and to the mixture are then gradually added 20 parts of glycide at 130–140° C. Thereafter ethylene oxide is passed into the mixture at about the same temperature until its weight has increased for about 40–50 parts. The resulting substance is easily soluble in water and may be used as a washing, dispersing, equalizing and wetting agent.

We claim:—

1. Addition products of at least 1 molecular quantity of glycide and of 1 molecular quantity of another organic compound containing a radical bearing reactive hydrogen selected from the group consisting of hydroxy, amino, carboxylic, carboxylic acid amide and sulfonic acid amide radicals, said addition products having been further reacted with an amount of alkylene oxide other than glycide that will render them substantially more hydrotropical and being colorless or weakly colored wax-like or oily substances suitable as auxiliary products for the textile industry.

2. Addition products of at least 1 molecular quantity of glycide and of 1 molecular quantity of another organic compound containing a radical bearing reactive hydrogen selected from the group consisting of hydroxy, amino, carboxylic, carboxylic acid amide and sulfonic acid amide radicals, said addition products having been further reacted with an amount of ethylene oxide that will render them substantially more hydrotropical and being colorless or weakly colored wax-like or oily substances suitable as auxiliary products for the textile industry.

3. Addition products of 1 to about 5 molecular quantities of glycide and one molecular quantity of another organic compound containing a radical bearing reactive hydrogen selected from the group consisting of hydroxy, amino, carboxylic, carboxylic acid amide and sulfonic acid amide radicals, said addition products having been further reacted with an amount of alkylene oxide other than glycide that will render them substantially more hydrotropical and being colorless or weakly colored wax-like or oily substances suitable as auxiliary products for the textile industry.

LUDWIG ORTHNER.
CLAUS HEUCK.